C. GOEBLER.
SPRING FOR SPRING BEARINGS.
APPLICATION FILED OCT. 24, 1910.

1,065,603.

Patented June 24, 1913.

WITNESSES:

INVENTOR
Charles Goebler
BY
ATTORNEYS.

UNITED STATES PATENT OFFICE.

CHARLES GOEBLER, OF POUGHKEEPSIE, NEW YORK, ASSIGNOR TO THE DE LAVAL SEPARATOR COMPANY, A CORPORATION OF NEW JERSEY.

SPRING FOR SPRING-BEARINGS.

1,065,603.          Specification of Letters Patent.      Patented June 24, 1913.

Application filed October 24, 1910. Serial No. 588,593.

*To all whom it may concern:*

Be it known that I, CHARLES GOEBLER, a citizen of the United States, residing at Poughkeepsie, county of Dutchess, and State of New York, have invented a new and useful Improvement in Springs for Spring-Bearings, of which the following is a full, clear, and exact description, reference being had to the accompanying drawings, which form a part of this specification.

My invention relates to an improved spring for a spring bearing which is especially designed for separators and to support the spindle or shaft of the separator bowl.

My invention consists of an annular spring formed of elastic wire which is bent alternately up and down in a zig zag manner, forming alternately a loop top and bottom. This forms alternate double wired sections. These sections are alternately straight and bent outward or inward, at an angle to form spring fingers. Of those sections bent outward at an angle they are alternately bent outward in opposite directions, for instance, from the top and bottom of the spring bearing and preferably curved. The bearing portion of all the sections projecting in one direction, for instance, from the top are in alinement and in like manner those projecting in the other direction, for instance, from the bottom, but the bearing points of one set are not in alinement with the bearing points of the other set. Thus I produce two sets of balancing bearing points.

I will now describe the embodiment of my invention illustrated in the accompanying drawings and then point out the invention in the claims.

Figure 1:
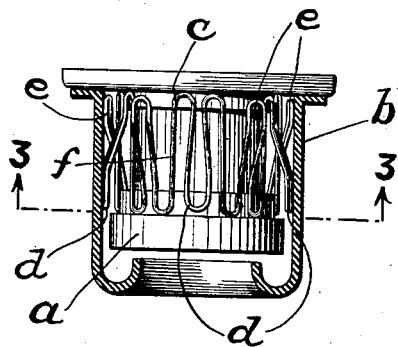
Figure 2:
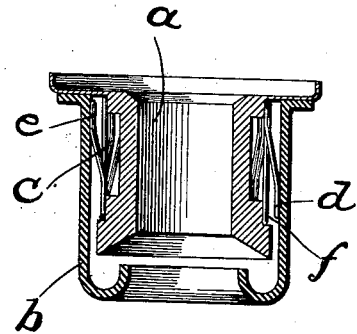
Figure 3:
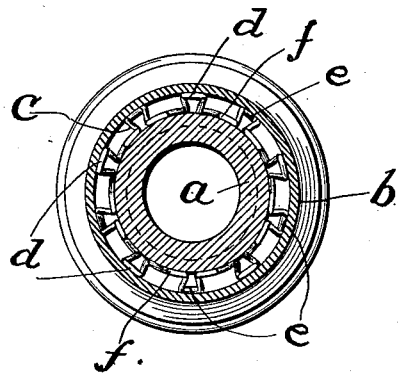

In the drawings—Figure 1 is a side elevation of an embodiment of my invention partly broken away. Fig. 2 is a vertical central section of same. Fig. 3 is an inverted plan view partly in section on lines 3—3, Fig. 1.

$a$ is the bearing bushing and $b$ the casing or outer support.

$c$ is my improved spring formed of elastic wire bent or coiled alternately up and down, forming two wire sections connected by the loop of the wire. The sections $d$ are bent outward from the top of the spring and curved. The sections $e$ are bent outward from the bottom of the spring and curved. Between the sections $d$ and $e$ are the straight sections $f$.

With this construction the spring is much strengthened, the alternately projecting sections $d$ and $e$ with the interposed straight portion distributing the pressure and enabling a light flexible wire to be used without sacrificing strength. Further, the different lines of contact of sections $d$ and $e$ give a balance of pressure which also adds to the resiliency and strength of the spring.

While I have described the sections, forming the spring fingers as projecting outwardly the same construction would exist if they projected inwardly, the only difference being that such sections would then contact with the bearing or inner support.

Having now fully described my invention, what I claim and desire to protect by Letters Patent is:—

1. An annular spring for insertion between an inner bushing member and an outer casing member, said spring comprising a wire composed of vertically-extending single wire sections integrally united alternately at top and bottom, whereby each vertically-extending single-wire section forms a part of two adjacent loops respectively closed at top and bottom, the closed upper ends of the loops comprising two sets arranged at two different distances from the axis of the spring and the closed lower ends of the loops comprising two sets also arranged at two different distances from the axis of the spring and alining respectively with the two sets of closed upper ends of the loops, whereby the spring is adapted to contact both at top and bottom with both members of the bearing.

2. An annular spring for insertion between an inner bushing member and an outer casing member, said spring comprising a wire bent zigzag to form a series of vertically extending single-wire sections, certain pairs of single-wire sections having their open upper ends at one distance from the axis of the spring and being bent downward between their ends so that their closed lower ends are at another distance from the axis of the spring, certain other pairs of single-wire sections having their open lower ends at the first-named distance from the axis of the spring and being bent upward between their ends so that their closed upper ends are at the second-named distance from the axis of the spring, whereby are formed double wire spring fingers each of which extends throughout the height of the spring from one bearing member to the other.

3. An annular spring for a spring bearing comprising a wire composed of vertically extending single wire sections integrally united alternately at top and bottom and formed as follows: two adjacent single wire sections bent to form a spring finger extending outward from the spring's axis and upward from its lower end, the next adjacent single-wire section extending substantially parallel to the spring's axis, the next two adjacent single wire sections bent to form a spring finger extending outward from the spring's axis and downward from its upper end, the next adjacent single-wire extending substantially parallel to the spring's axis, and so on throughout substantially the circumference of the spring.

4. An annular spring for a spring bearing comprising a wire composed of vertically-extending single wire sections integrally united alternately at top and bottom, certain pairs of single wire sections being bent at an angle to the plane of extension of the spring to form spring fingers extending downward from the upper portion of the spring, and certain other pairs of single-wire sections being bent on an angle to the plane of extension of the spring to form spring fingers extending upward from the lower portion of the spring, the bearing points of the spring fingers of each set being in alinement with each other but out of alinement with the spring fingers of the other set.

5. An annular spring for a spring bearing comprising a wire bent zig zag to form a series of longitudinally-extending loops, said loops closed at their upper ends and bent between their ends at an angle to the axis of the spring, loops, alternating with the first named loops, closed at their lower ends and bent between their ends at an angle to the axis of the spring, and single wire sections connecting oppositely bent loops and extending substantially parallel to the axis of the spring.

6. An annular spring for a spring bearing comprising a wire composed of vertically-extending single-wire sections integrally united at top and bottom whereby each vertically-extending single-wire section forms a part of two adjacent loops respectively closed at top and bottom, some of said loops being bent at an angle to the axis of the spring to form spring fingers extending downward from the upper portion of the spring and others of said loops being bent at an angle to the axis of the spring to form spring fingers extending upward from the lower portion of the spring, certain of said single-wire sections not being so bent but extending parallel to the axis of the spring and serving to connect the wire sections forming adjacent upwardly-bent and downwardly-bent spring fingers.

7. An annular spring for a spring bearing comprising a wire bent zig zag to form a series of single wire sections extending integrally united alternately at top and bottom, said wire being successively bent vertically in one direction and outward to form one single wire section and around to form a loop, thence vertically in the opposite direction and inward to form the next single wire section and around to form a loop, thence vertically in the first-named direction to form the next single wire section and around to form a loop, thence vertically in the second-named direction and outward to form the next single wire section and around to form a loop, thence vertically in the first named direction and inward to form the next single wire section and around to form a loop, and thence vertically in the second named direction to form the next single wire section and around to form a loop, and so on throughout the circumference of the spring.

8. In a spring bearing, the combination with the inner bushing member and the outer casing member, of an annular spring between said members comprising a wire bent zig zag to form a series of single-wire sections extending lengthwise of the bearing, and united alternately at top and bottom, certain of the single-wire sections being bent so that the closed upper ends of the loops comprise two sets contacting respectively with the two bearing members and the closed lower ends of the loops also comprise two sets contacting respectively with the two bearing members.

9. In a spring bearing, the combination with the inner bushing member and the outer casing member, of an annular spring between said members comprising a wire bent zig zag to form a series of single-wire sections extending lengthwise of the bearing, certain pairs of single-wire sections being bent to form spring fingers extending from top to bottom of the spring and whose open upper ends contact with one bearing member and whose closed lower ends contact with the other bearing member, while certain other pairs of single-wire sections are bent to form spring fingers extending from bottom to top of the spring and whose open lower ends contact with the first bearing member and whose closed upper ends contact with the second bearing member.

10. In a spring bearing, the combination with the inner bushing member and the outer casing member, of an annular spring between said members comprising a wire bent zig zag to form a series of single-wire sections extending lengthwise of the bearing and united alternately at top and bottom, certain of the loops so formed being bent to form spring fingers extending downward from one bearing member to the other, and certain other of said loops being bent to form spring fingers extending upward from one bearing member to the other, the closed ends of all of the spring-finger loops contacting with the same member of the bearing and the open ends of adjacent spring-finger loops being united by single-wire sections contacting at both its upper and lower ends with the other member of the bearing.

11. In a spring bearing, the combination with the inner bushing member and the outer casing member, of an annular spring between said members comprising a wire bent zigzag to form a series of single wire sections extending lengthwise of the bearing and united alternately at top and bottom, said wire being successively bent outward and downward from one member to the other, thence bent inward and upward from the second member to the first member, thence extended downward, thence bent outward and upward from the first member to the second member, thence bent inward and downward from the second member to the first member, and thence extended upward, and so on throughout the circumference of the bearing.

In testimony of which invention, I have hereunto set my hand, at Poughkeepsie, on this 18″ day of October, 1910.

CHARLES GOEBLER.

Witnesses:
 HARRY C. BARKER,
 M. E. MANNION.

---

Copies of this patent may be obtained for five cents each, by addressing the " Commissioner of Patents, Washington, D. C."